(12) United States Patent
Anderson et al.

(10) Patent No.: US 11,910,423 B2
(45) Date of Patent: Feb. 20, 2024

(54) SYSTEMS AND METHODS FOR REDUCING FALSE RADAR DETECTION

(71) Applicant: Cisco Technology, Inc., San Jose, CA (US)

(72) Inventors: Fred J. Anderson, Lakeville, OH (US); Paul Jeffrey Stager, Akron, OH (US); Evgeny Yankevich, Beachwood, OH (US); Matthew Aaron Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 219 days.

(21) Appl. No.: 17/512,098

(22) Filed: Oct. 27, 2021

(65) Prior Publication Data

US 2023/0126483 A1 Apr. 27, 2023

(51) Int. Cl.
*H04W 72/541* (2023.01)
*G01S 7/02* (2006.01)
*H04W 72/0453* (2023.01)
*H04W 88/08* (2009.01)

(52) U.S. Cl.
CPC ........... *H04W 72/541* (2023.01); *G01S 7/021* (2013.01); *H04W 72/0453* (2013.01); *H04W 88/08* (2013.01)

(58) Field of Classification Search
CPC ........... H04W 72/082; H04W 72/0453; H04W 72/541; H04W 88/08; G01S 7/021
See application file for complete search history.

(56) References Cited

U.S. PATENT DOCUMENTS

| 3,657,654 | A | 4/1972 | Friberg | |
|---|---|---|---|---|
| 5,513,215 | A | 4/1996 | Marchetto et al. | |
| 7,593,692 | B2 * | 9/2009 | Hansen | H04B 1/1027 455/313 |
| 7,701,382 | B2 * | 4/2010 | Hansen | H04K 3/822 342/52 |
| 7,834,800 | B1 * | 11/2010 | Chhabra | G01S 7/021 342/52 |
| 7,936,714 | B1 | 5/2011 | Karr et al. | |

(Continued)

FOREIGN PATENT DOCUMENTS

| EP | 2947784 A1 * | 11/2015 | ........... H04B 1/7163 |
|---|---|---|---|
| EP | 3316614 A1 * | 5/2018 | ........... H04B 17/336 |

(Continued)

*Primary Examiner* — Hai V Nguyen
(74) *Attorney, Agent, or Firm* — Patterson + Sheridan, LLP

(57) ABSTRACT

Methods and systems for distinguishing between radar signals and Wi-Fi signals are provided. When a set of electromagnetic signals are received, various tests are performed on the signals to determine if the signals are associated with radar pulses or if the signals are more likely to be associated with stray Wi-Fi signals or other non-radar interference. One such test relies on the relatively small variance of frequencies used by radar pulses when compared to the high variation of Wi-Fi signals. Another test relies on the relatively low peak to average power ratio of signals associated with radar pulses when compared to Wi-Fi signals. The tests described herein are an improvement on existing methods for distinguishing radar signals from Wi-Fi signals and result in less switching of Wi-Fi channels due to erroneously detected radar signals.

20 Claims, 4 Drawing Sheets

(56) References Cited

U.S. PATENT DOCUMENTS

| | | | | |
|---|---|---|---|---|
| 7,965,761 | B2* | 6/2011 | Shattil | H04L 1/04 |
| | | | | 375/147 |
| 8,032,087 | B2* | 10/2011 | Muquet | H04K 3/822 |
| | | | | 455/67.11 |
| 8,169,360 | B1* | 5/2012 | Weatherford | G01S 7/295 |
| | | | | 342/63 |
| 8,190,162 | B2* | 5/2012 | Hansen | H04B 15/02 |
| | | | | 342/131 |
| 8,219,034 | B2* | 7/2012 | Belcea | G01S 7/021 |
| | | | | 455/67.14 |
| 8,526,388 | B1 | 9/2013 | Kaukovuori et al. | |
| 9,250,314 | B2* | 2/2016 | Rezk | H04K 3/822 |
| 9,270,331 | B2 | 2/2016 | Cunningham | |
| 9,420,530 | B1* | 8/2016 | Duxbury | H04W 52/02 |
| 9,736,845 | B1* | 8/2017 | Yi | H04W 74/0808 |
| 9,791,552 | B1* | 10/2017 | Schuman | H01Q 3/267 |
| 9,807,646 | B1 | 10/2017 | Jorgavanovic | |
| 9,838,882 | B1 | 12/2017 | Yankevich et al. | |
| 9,992,803 | B2* | 6/2018 | Xiang | H04W 76/10 |
| 11,284,826 | B2* | 3/2022 | Shariat | A61B 5/361 |
| 11,394,594 | B2* | 7/2022 | Pados | H04B 13/02 |
| 11,531,087 | B2* | 12/2022 | Hu | G08B 21/0469 |
| 2004/0229650 | A1 | 11/2004 | Fitton et al. | |
| 2005/0059364 | A1* | 3/2005 | Hansen | H04B 1/1027 |
| | | | | 455/73 |
| 2006/0252418 | A1 | 11/2006 | Quinn et al. | |
| 2007/0077892 | A1* | 4/2007 | Muquet | H04K 3/822 |
| | | | | 455/67.11 |
| 2008/0070564 | A1* | 3/2008 | Li | H04B 7/0617 |
| | | | | 455/424 |
| 2013/0128927 | A1 | 5/2013 | Yucek et al. | |
| 2013/0237160 | A1 | 9/2013 | Hessel | |
| 2014/0153617 | A1* | 6/2014 | Norris | H04L 27/0006 |
| | | | | 375/340 |
| 2014/0253361 | A1 | 9/2014 | Rezk et al. | |
| 2014/0254346 | A1* | 9/2014 | Rezk | G01S 7/021 |
| | | | | 370/210 |
| 2015/0238137 | A1* | 8/2015 | Eyal | A61B 5/6898 |
| | | | | 600/595 |
| 2016/0014824 | A1* | 1/2016 | Xiang | H04W 72/02 |
| | | | | 370/329 |
| 2016/0066199 | A1 | 3/2016 | Yeddala et al. | |
| 2016/0285611 | A1 | 9/2016 | Fischer et al. | |
| 2017/0026847 | A1* | 1/2017 | Farshchian | G01S 7/021 |
| 2017/0082723 | A1* | 3/2017 | Pajovic | G01S 5/0278 |
| 2018/0180714 | A1* | 6/2018 | Zur | H04K 3/822 |
| 2019/0028899 | A1 | 1/2019 | Yankevich | |
| 2019/0069792 | A1* | 3/2019 | Shariat | A61B 5/316 |
| 2019/0178980 | A1* | 6/2019 | Zhang | A61B 5/7267 |
| 2020/0191913 | A1* | 6/2020 | Zhang | G01S 7/412 |
| 2020/0271756 | A1* | 8/2020 | Novoselsky | G01S 7/415 |
| 2020/0288326 | A1* | 9/2020 | Borges | H04W 24/10 |
| 2020/0319301 | A1* | 10/2020 | Qiu | G06V 10/431 |
| 2021/0208237 | A1* | 7/2021 | Ravenscroft | H04L 27/2626 |
| 2021/0374642 | A1* | 12/2021 | Bronicki | G06F 18/2431 |
| 2021/0405178 | A1* | 12/2021 | Livshitz | G01S 7/415 |
| 2022/0057478 | A1* | 2/2022 | Braun | H04L 5/0044 |
| 2022/0334215 | A1* | 10/2022 | Thompson | G06F 18/2415 |
| 2022/0386945 | A1* | 12/2022 | Wu | A61B 5/4809 |
| 2022/0413092 | A1* | 12/2022 | Foi | G01S 7/2813 |
| 2023/0092386 | A1* | 3/2023 | Mamandipoor | G01S 13/583 |
| | | | | 600/301 |

FOREIGN PATENT DOCUMENTS

| | | | | |
|---|---|---|---|---|
| EP | 4030806 A1 | * | 7/2022 | |
| WO | 2014/138645 | | 9/2014 | |
| WO | WO-2014138645 A1 | * | 9/2014 | G01S 7/021 |
| WO | WO-2015168850 A1 | * | 11/2015 | H04W 16/10 |

* cited by examiner

SYSTEMS AND METHODS FOR REDUCING FALSE RADAR DETECTION

BACKGROUND

Dynamic Frequency Selection (DFS) is a channel allocation scheme specified for wireless LAN, commonly known as Wi-Fi. It is designed to prevent electromagnetic interference with other usages of the C band frequency band that had predated Wi-Fi, such as military radar, satellite communication, and weather radar. In general, when a wireless device, such as an access point, is communicating over a channel of the C band frequency using Wi-Fi, the device monitors for radar or other communications on the channel. In the event that a radar communication is detected, the device must announce a new channel that the device will communicate on and must immediately cease communicating on the channel in which the radar communication was detected.

While DFS has been successful in preventing interference between Wi-Fi and the other usages of the C band frequencies, current methods for detecting radar or other communications is subject to false alarms. In particular, Wi-Fi communications, such as stray signals or communications in different channels, can be misinterpreted as radar communications. These false detections can result in unnecessary disruptions of network communications as access points and their associated clients are forced to reconnect on a different channel in response to each false detection.

BRIEF DESCRIPTION OF THE DRAWINGS

The following detailed description of illustrative embodiments is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DESCRIPTION OF EXAMPLE EMBODIMENTS

Overview

Figure 1:
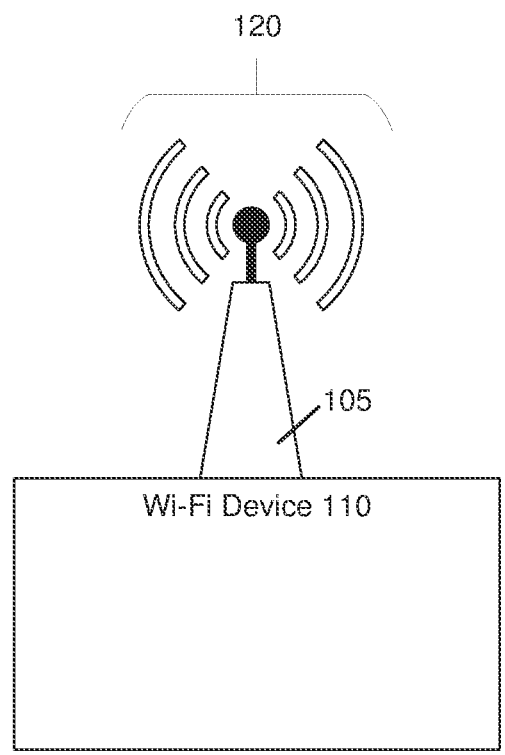
FIG. 1 is an illustration of an exemplary Wi-Fi device.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments.

Methods and systems for distinguishing between radar signals and Wi-Fi signals are provided. When a set of electromagnetic signals are received, various tests are performed on the signals to determine if the signals are associated with radar pulses or if the signals are more likely to be associated with stray Wi-Fi signals or other non-radar interference. One such test relies on the relatively small variance of frequencies used by radar pulses when compared to the high variation of Wi-Fi signals. Another test relies on the relatively low peak to average power ratio of signals associated with radar pulses when compared to Wi-Fi signals. The tests described herein are an improvement on existing methods for distinguishing radar signals from Wi-Fi signals and result in less switching of Wi-Fi channels due to erroneously detected radar signals.

In an embodiment, a method is provided. The method includes: while communicating on a first channel, receiving a set of electromagnetic signals by a computing device; estimating frequencies for the set of electromagnetic signals by the computing device; calculating a variance of the estimated frequencies by the computing device; based on the calculated variance, determining whether the set of electronic signals are radar signals by the computing device; and if it is determined that the set of electronic signals are not radar signals, continuing to communicate on the first channel by the computing device.

Embodiments may include some or all of the following features. The method may further include: if it is determined that the set of electronic signals are radar signals: stopping communication on the first channel; selecting a second channel; and communicating on the second channel. The first communication channel may be a DFS Wi-Fi channel. The computing device may be an access point. Determining whether the set of electronic signals are radar signals may include determining whether the calculated variance satisfies a variance threshold. The calculated variance may satisfy the variance threshold when the calculated variance is less than the variance threshold. The method may further include: calculating a power for each electromagnetic signal of the set of electromagnetic signals; determining a peak power from the calculated powers; determining an average power from the calculated powers; based on the determined average power and the determined peak power, determining whether the set of electronic signals are radar signals. Determining whether the set of electronic signals are radar signals may include: calculating a ratio of the calculated peak power to the calculated average power; and determining whether the calculated ratio satisfies a ratio threshold. The calculated ratio may satisfy the ratio threshold when the calculated ratio is less than the ratio threshold. The set of electromagnetic signals may include one or more of on-channel and off-channel corrupted Wi-Fi frames or off-channel power leaks.

In an embodiment, a method is provided. The method includes: while communicating on a first channel, receiving a set of electromagnetic signals by a computing device; calculating a power for each electromagnetic signal of the set of electromagnetic signals by the computing device; determining a peak power from the calculated powers by the computing device; determining an average power from the calculated powers by the computing device; based on the determined average power and the determined peak power, determining whether the set of electronic signals are radar signals by the computing device; and if it is determined that the set of electronic signals are not radar signals, continuing to communicate on the first channel by the computing device.

Embodiments may include some or all of the following features. The method may further include: If it is determined that the set of electronic signals are radar signals: stopping communication on the first channel; selecting a second channel; and communicating on the second channel. The first communication channel may be a DFS Wi-Fi channel.

The computing device may be an access point. Determining whether the set of electronic signals are radar signals may include: calculating a ratio of the calculated peak power to the calculated average power; and determining whether the calculated ratio satisfies a ratio threshold. The calculated ratio may satisfy the ratio threshold when the calculated ratio is less than the ratio threshold. The method may further include: estimating frequencies for the set of electromagnetic signals; calculating a variance of the estimated frequencies; and based on the calculated variance, determining whether the set of electronic signals are radar signals. Determining whether the set of electronic signals are radar signals may include determining whether the calculated variance satisfies a variance threshold. The calculated variance may satisfy the variance threshold when the calculated variance is less than the variance threshold. The set of electromagnetic signals may include one or more of on-channel and off-channel corrupted Wi-Fi frames or off-channel power leaks.

EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is an illustration of an exemplary Wi-Fi device 110. As shown, the Wi-Fi device 110 may include one or more antennas 105 that are capable of receiving and transmitting information via electromagnetic signals 120. As part of the Wi-Fi standard, the Wi-Fi device 110 may communicate information with other Wi-Fi devices (not shown) using one of a plurality of channels. Each channel may be associated with a different frequency range of electromagnetic signals 120.

As used herein, a Wi-Fi device 110 may be any device that is capable of communication (i.e., receiving or transmitting) using any of the Wi-Fi standard protocols. Examples include, but are not limited to, routers, access points, mobile phones, laptop or desktop computers, video game consoles, and other connected deices (e.g., thermostats, cameras, sensors, lights, and doorbells). The Wi-Fi device 110 may be implemented using one or more general purpose computing devices such as the computing device 400 illustrated with respect to FIG. 4.

To increase the number of channels available for communication, the Wi-Fi device 110 is permitted to communication using what are referred to as dynamical frequency selection ("DFS") channels. The DFS channels use electromagnetic frequencies that had been previously reserved for use by radar, such as military radar, satellite communications, and weather radar. The particular DFS channels and associated frequencies varies by country.

While the use of DFS channels reduces overall channel congestion, there are requirements and burdens associated with the use of such channels. In particular, when using a DFS channel, if the Wi-Fi device 110 detects an electromagnetic signal 120 associated with radar, the Wi-Fi device 110 must immediately stop using the DFS channels and select a new channel for communication. Any devices that were communicating with the Wi-Fi device 110 using the DFS channel will be disconnected and will be forced to reconnect with the Wi-Fi device 110 on the new channel.

One drawback with such as approach is that some non-radar electromagnetic signals 120 received by the antenna 105 may be similar to radar signals and may cause the Wi-Fi device 110 to unnecessarily switch channels. Examples of such signals include Wi-Fi signals leaked from channels adjacent to the current DFS channel and corrupted Wi-Fi signals or headers.

In order to reduce the number of falsely detected radar signals, when electromagnetic signals 120 are received that include one or more pulses that could be associated with radar, the Wi-Fi device 110 may perform one or more verification tests on received pulses to determine if they are likely associated with radar. When the one or more tests determine that the received pulses are not associated with radar, then they can be ignored by the Wi-Fi device 110. When the one or more tests determine that the received pulses may be associated with radar, the Wi-Fi device 110 may switch channels. Depending on the embodiment, a set of electromagnetic signals 120 may be associated with radar when there is no Wi-Fi header.

One such verification test is referred to herein as the peak to average power ratio (PAR) test. One property associated with real radar pulses is that there signals have relatively uniform power. Thus, if a set of electromagnetic signals 120 are associated with radar, the PAR ratio (i.e., peak or max signal power/mean signal power) for the signals 120 should be relatively low. Conversely, if a set of electromagnetic signals 120 have a relatively high PAR ratio, then they are unlikely to be associated with radar.

As part of the PAR test, when a set of electromagnetic signals 120 is received by the Wi-Fi device 110, the Wi-Fi device 110 computes the power of each received signal, and using the computed powers, computes the average power of the set of electromagnetic signals 120. Any method for computing signal power may be used. In some embodiments, the average power may be the mean power, although other types of averages may be used.

After or before computing the average power, the Wi-Fi device 110 may further compute the peak power for the set of electromagnetic signals 120. The peak power may be the highest computed power for any signal from the set of electromagnetic signals 120.

The Wi-Fi device 110 may compute the PAR for the set of electromagnetic signals and may determine if the set of electromagnetic signals 120 is or is not likely to be associated with radar. In some embodiments, the Wi-Fi device 110 may make the determination using what is referred to as a PAR threshold. In general, PAR of a signal is a function of modulation type it uses. Specifically for WiFi that uses OFDM modulation a typical PAR range is between 12 and 15 dB. While for the most radar signals PAR range is between 3 and 5 dB.

Accordingly, the PAR threshold may be selected such that a set of electromagnetic signals whose PAR is above the PAR threshold is likely to be not associated with radar, and a set of electromagnetic signals whose PAR is below the PAR threshold is likely to be associated with radar. The PAR threshold may be empirically determined based on observed radar signals and may be set by a user or administrator. An example PAR threshold is 12 db.

Another test that may be used to distinguish radar related electromagnetic signals 120 and non-radar related electromagnetic signals 120, is referred to herein as the variance test. In general, the variance test measures the overall difference in frequencies of the electromagnetic signals 120 in the in the set of electromagnetic signals 120. With respect to radar signals, the signals in a radar pulse tend to be more focused in frequency than electromagnetic signals 120 associated with a Wi-Fi signal which tend to have a wide range of frequencies. Thus, if the variance of the frequencies of the set of frequencies 120 is relatively low then the set of frequencies is likely to be a radar pulse, and if the variance of the frequencies of the set of frequencies is relatively high, then the set of frequencies is likely to be associated with Wi-Fi.

As part of the variance test, when a set of electromagnetic signals 120 is received by the Wi-Fi device 110, the Wi-Fi device 110 determines the frequency of each signal in the set of signals 120. Any method for determining the frequency of a received signal may be used.

In some embodiment, the Wi-Fi device may calculate or estimate the frequency of a signal using the following equation 1:

$$F(n) = \frac{\text{angle}(s[n] * conj(s[n+1])) * F_s}{2\pi} \quad (1)$$

The Wi-Fi device 110 may then calculate the variance of the frequencies of the electromagnetic signals. Any method for calculating a variance may be used.

Once the variance has been calculated, the Wi-Fi device 110 may compare the calculated variance to what is referred to as a variance threshold. If the calculated variance is above the variance threshold, then the set of electromagnetic signals 120 are likely associated with Wi-Fi and are not associated with a radar pulse. If the calculated valiance is below the variance threshold, then the set of electromagnetics signals 120 are likely associated with a radar pulse. Similar to the PAR threshold, the variance threshold may be empirically determined and may be set by a user or administrator.

In some embodiments, when a set of electromagnetic signals 120 are received, before performing either of the verification tests (e.g., the PAR or variance test), the the Wi-Fi device 110 may further cut or remove portions of the electromagnetic signals that are above a threshold. The portions may be cut or removed using a power gate, for example.

The Wi-Fi device 110 may perform some or both of the PAR and variance tests on a set of electromagnetic signals 120 that are suspected of being associated with a radar pulse. In some embodiments, a set of electromagnetic signals 120 is considered to be associated with radar when it passes either of the PAR and variance tests. For example, a set of electromagnetic signals 120 may fail the PAR test (i.e., may be determined not to be associated with radar), but may pass the variance test test (i.e., may be determined to be associated with radar). In such an embodiment, the set of electronic signals 120 may be determined to be associated with radar because it passed just one of the tests.

In other embodiments, a set of electromagnetic signals 120 is considered to be associated with radar when it passes both of the PAR and variance tests. For example, a set of electromagnetic signals 120 may fail the PAR test (i.e., may be determined not to be associated with radar), but may pass the variance test test (i.e., may be determined to be associated with radar). In such an embodiment, the set of electronic signals 120 may be determined to be not associated with radar because it did not pass both of the tests.

Figure 2:
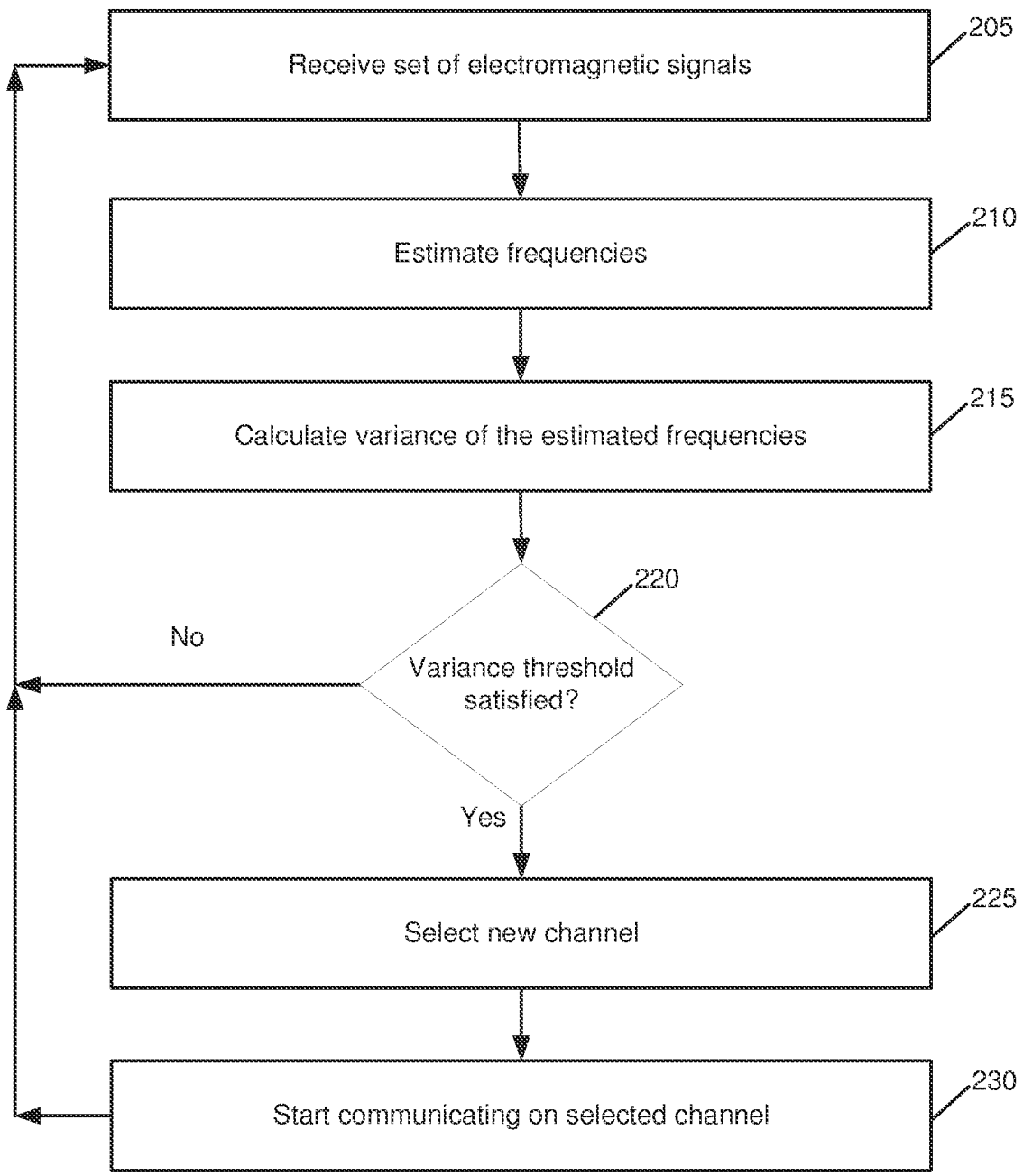
FIG. 2 is an operational flow of an implementation of a method for determinizing if a set of electromagnetic signals is associated with a radar pulse using the variance test.

FIG. 2 is an operational flow of an implementation of a method 200 for determinizing if a set of electromagnetic signals is associated with a radar pulse. The method 200 may be implemented by the Wi-Fi device 110. The method 200 may implement the variance test described above.

At 205, a set of electromagnetic signals is received. The set of electromagnetic signals 120 may be received by the Wi-Fi device 110 via one or more antennae 105. Depending on the embodiment, the Wi-Fi device 110 may suspect that the set of electromagnetic signals 120 is associated with a radar pulse. The Wi-Fi device 110 may be communicating with one or more other Wi-Fi devices using a DFS channel. In some embodiments, the set of electromagnetic signals 120 may be cut using one or more thresholds by a power gate.

At 210, frequencies are estimated. The frequencies of the signals are estimated by the Wi-Fi device 110. Any method for estimating frequencies may be used. In some embodiments, the frequencies may be estimated using the equation 1 described above.

At 215, a variance of the estimated frequencies is calculated. The variance may be calculated by the Wi-Fi device 110 using the estimated frequencies. Any method for calculating a variance may be used.

At 220, whether the calculated variance satisfies a threshold is determined. Whether the calculated variance satisfies the variance threshold may be determined by the Wi-Fi device 110. In some embodiments, the variance threshold may be satisfied when the calculated variance is less than the variance threshold. If the variance threshold is not satisfied, then the set of electromagnetic signals 120 are not associated with a radar pulse and the method 200 may continue at 205 where a next set of electromagnetic signals 120 may be considered (i.e., a next pulse). Else, the method 200 may continue at 225.

At 225, a new channel is selected. The new channel may be selected by the Wi-Fi device 110. Because the variance threshold was satisfied, the set of electromagnetic signals 120 is likely to be associated with a radar pulse, and therefore the Wi-Fi device 110 must immediately stop using the DFS channel and must select a new channel for broadcasting. The selected channel may be a different DFS channel or may be a non-DFS channel. Any method for selecting a channel may be used.

At 230, communication on the selected channel may start. The communication may be started by the Wi-Fi device 110. The method 200 may then return to 205 and wait for a next set of signals 120 to be received for testing.

Figure 3:
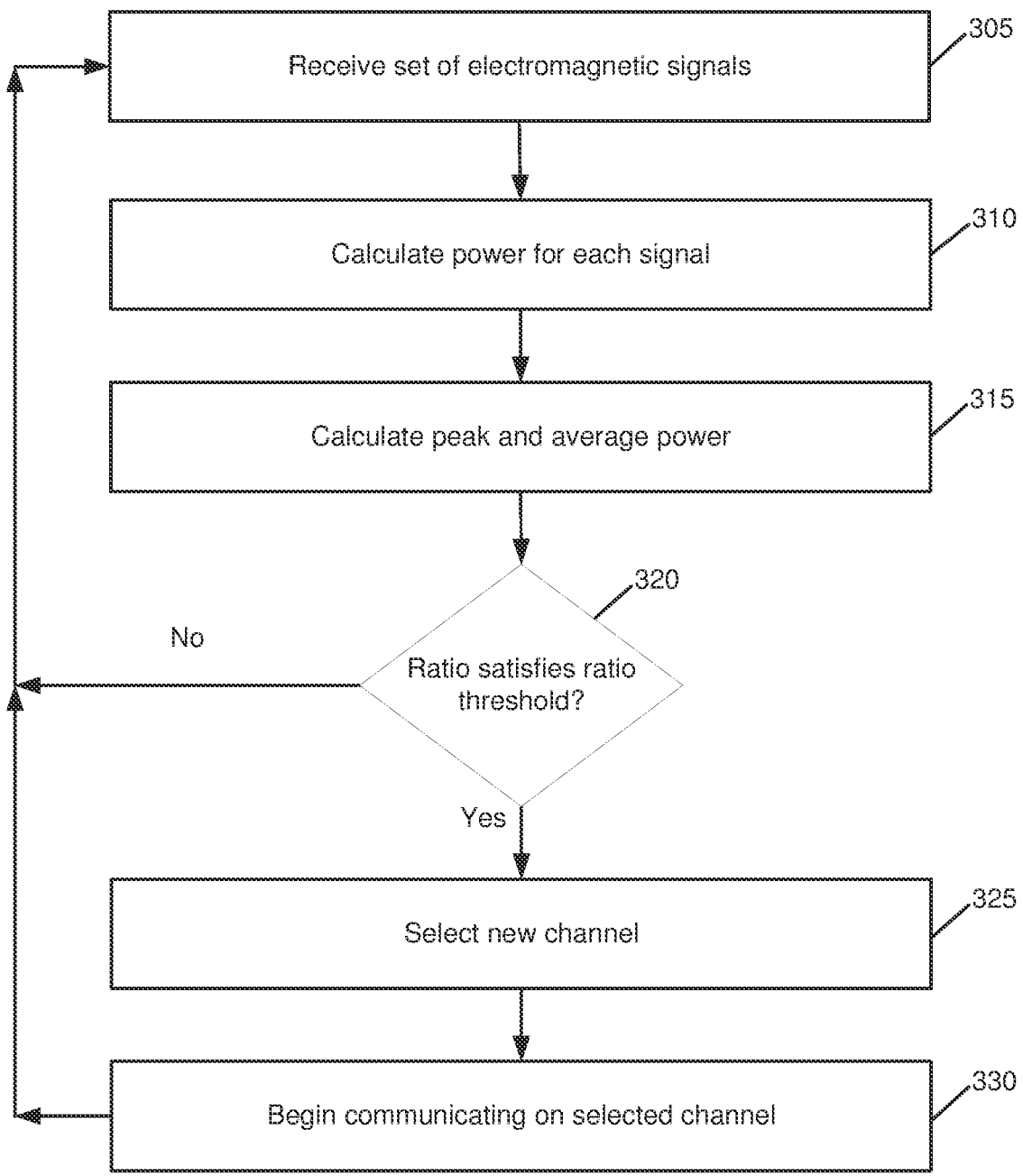
FIG. 3 is an operational flow of an implementation of a method for determinizing if a set of electromagnetic signals is associated with a radar pulse using the PAR test.

FIG. 3 is an operational flow of an implementation of a method 300 for determinizing if a set of electromagnetic signals is associated with a radar pulse. The method 300 may be implemented by the Wi-Fi device 110. The method 300 may implement the PAR test described above.

At 305, a set of electromagnetic signals is received. The set of electromagnetic signals 120 may be received by the Wi-Fi device 110 via one or more antennae 105. Depending on the embodiment, the Wi-Fi device 110 may suspect that the set of electromagnetic signals 120 is associated with a radar pulse. The Wi-Fi device 110 may be communicating with one or more other Wi-Fi devices using a DFS channel. In some embodiments, the set of electromagnetic signals 120 may be cut using one or more thresholds by a power gate.

At 310, a power is calculated for each signal. The power of each signal may be calculated by the Wi-Fi device 110.

Any method for calculating power may be used. In some embodiments, the frequencies may be estimated using the equation 1 described above.

At 315, peak and average power are calculated. The peak power and average power may be calculated by the Wi-Fi device 110 based on the calculated powers for each signal of the set of electromagnetic signals 120. Any method for calculating peak and average signal may be used.

At 320, whether a ratio of the determined peak power and average power satisfies a threshold is determined. Whether the PRA ratio satisfies the PAR threshold may be determined by the Wi-Fi device 110. In some embodiments, the PAR threshold may be satisfied when the PAR ratio is less than the PAR threshold. If the PAR threshold is not satisfied, then the set of electromagnetic signals 120 are not associated with a radar pulse and the method 300 may continue at 305 where a next set of electromagnetic signals 120 may be considered (i.e., a next pulse). Else, the method 300 may continue at 325.

At 325, a new channel is selected. The new channel may be selected by the Wi-Fi device 110. Because the variance threshold was satisfied, the set of electromagnetic signals 120 is likely to be associated with a radar pulse, and therefore the Wi-Fi device 110 must immediately stop using the DFS channel and must select a new channel for broadcasting. The selected channel may be a different DFS channel or may be a non-DFS channel. Any method for selecting a channel may be used.

At 330, communication on the selected channel may start. The communication may be started by the Wi-Fi device 110. The method 300 may then return to 305 and wait for a next set of electromagnetic signals 120 to be received for testing.

Figure 4:
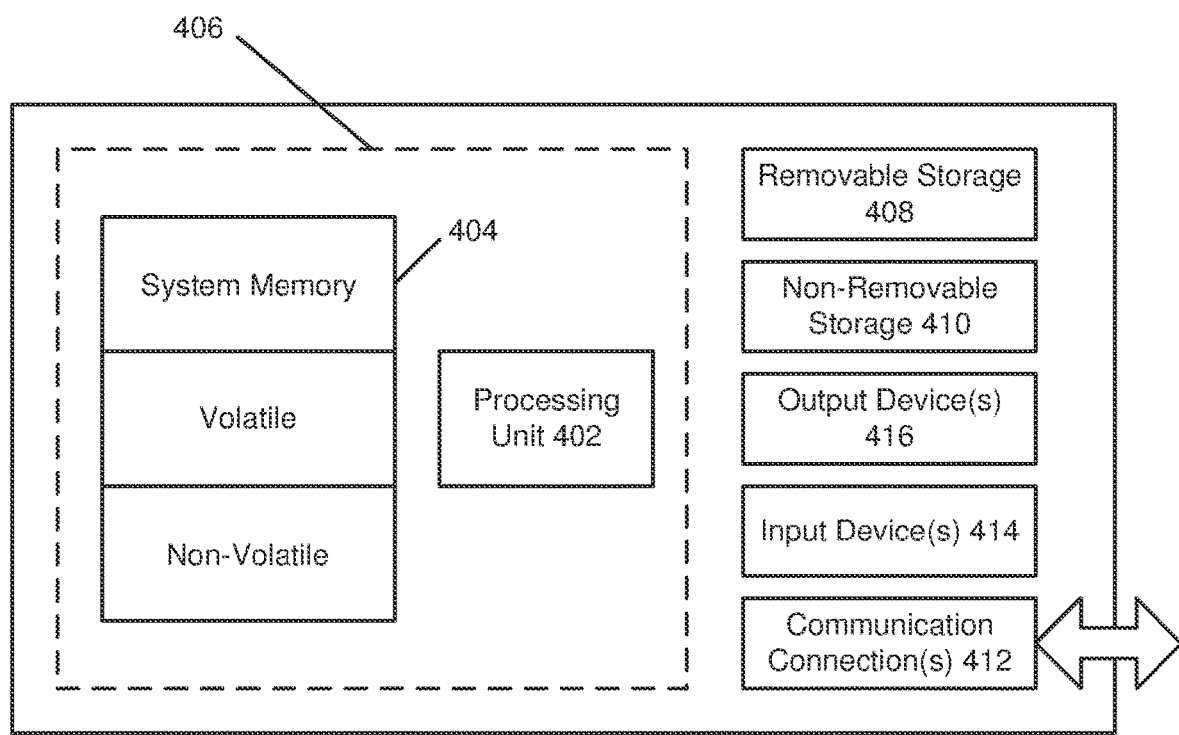
FIG. 4 shows an exemplary computing environment in which example embodiments and aspects may be implemented.

FIG. 4 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communication connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

The present invention has been explained with reference to specific embodiments. For example, while embodiments of the present invention have been described as operating in connection with IEEE 802.3 networks, the present invention can be used in connection with any suitable wired network environment. Other embodiments will be evident to those of ordinary skill in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   while communicating on a first channel, receiving a set of electromagnetic signals by a computing device;
   estimating frequencies for the set of electromagnetic signals by the computing device;
   calculating a variance of the estimated frequencies by the computing device;
   based on the calculated variance, determining whether the set of electromagnetic signals are radar signals by the computing device; and
   if it is determined that the set of electromagnetic signals are not radar signals, continuing to communicate on the first channel by the computing device.

2. The method of claim 1, further comprising if it is determined that the set of electromagnetic signals are radar signals:
   stopping communication on the first channel;
   selecting a second channel; and
   communicating on the second channel.

3. The method of claim 1, wherein the first communication channel is a DFS Wi-Fi channel.

4. The method of claim 1, wherein the computing device is an access point.

5. The method of claim 1, wherein determining whether the set of electromagnetic signals are radar signals comprises determining whether the calculated variance satisfies a variance threshold.

6. The method of claim 5, wherein the calculated variance satisfies the variance threshold when the calculated variance is less than the variance threshold.

7. The method of claim 1, further comprising:
   calculating a power for each electromagnetic signal of the set of electromagnetic signals;
   determining a peak power from the calculated powers;
   determining an average power from the calculated powers;
   based on the determined average power and the determined peak power, determining whether the set of electromagnetic signals are radar signals.

8. The method of claim 7, wherein determining whether the set of electromagnetic signals are radar signals comprises:
   calculating a ratio of the calculated peak power to the calculated average power; and
   determining whether the calculated ratio satisfies a ratio threshold.

9. The method of claim 8, wherein the calculated ratio satisfies the ratio threshold when the calculated ratio is less than the ratio threshold.

10. The method of claim 1, wherein the set of electromagnetic signals comprises one or more of on-channel and off-channel corrupted Wi-Fi frames or off-channel power leaks.

11. A method comprising:
    while communicating on a first channel, receiving a set of electromagnetic signals by a computing device;
    calculating a power for each electromagnetic signal of the set of electromagnetic signals by the computing device;
    determining a peak power from the calculated powers by the computing device;
    determining an average power from the calculated powers by the computing device;
    based on the determined average power and the determined peak power, determining whether the set of electromagnetic signals are radar signals by the computing device; and
    if it is determined that the set of electromagnetic signals are not radar signals, continuing to communicate on the first channel by the computing device.

12. The method of claim 11, further comprising if it is determined that the set of electromagnetic signals are radar signals:
    stopping communication on the first channel;
    selecting a second channel; and
    communicating on the second channel.

13. The method of claim 11, wherein the first communication channel is a DFS Wi-Fi channel.

14. The method of claim 11, wherein the computing device is an access point.

15. The method of claim 11, wherein determining whether the set of electromagnetic signals are radar signals comprises:
    calculating a ratio of the calculated peak power to the calculated average power; and
    determining whether the calculated ratio satisfies a ratio threshold.

16. The method of claim 15, wherein the calculated ratio satisfies the ratio threshold when the calculated ratio is less than the ratio threshold.

17. The method of claim 11, further comprising:
    estimating frequencies for the set of electromagnetic signals;
    calculating a variance of the estimated frequencies; and
    based on the calculated variance, determining whether the set of electromagnetic signals are radar signals.

18. The method of claim 17, wherein determining whether the set of electromagnetic signals are radar signals comprises determining whether the calculated variance satisfies a variance threshold.

19. The method of claim 18, wherein the calculated variance satisfies the variance threshold when the calculated variance is less than the variance threshold.

20. A system comprising:
    at least one computing device; and
    a non-transitory computer-readable medium storing computer-executable instructions that when executed by the at least one computing device causes the at least one computing device to:
    while communicating on a first channel, receive a set of electromagnetic signals;
    estimate frequencies for the set of electromagnetic signals;
    calculate a variance of the estimated frequencies;
    based on the calculated variance, determine whether the set of electromagnetic signals are radar signals;

if it is determined that the set of electromagnetic signals are not radar signals, continue to communicate on the first channel; and if it is determined that the set of electromagnetic signals are radar signals:
   stop communication on the first channel;
   select a second channel; and
   communicate on the second channel.

\* \* \* \* \*

UNITED STATES PATENT AND TRADEMARK OFFICE
CERTIFICATE OF CORRECTION

PATENT NO. : 11,910,423 B2
APPLICATION NO. : 17/512098
DATED : February 20, 2024
INVENTOR(S) : Fred J. Anderson et al.

It is certified that error appears in the above-identified patent and that said Letters Patent is hereby corrected as shown below:

In the Specification

In Column 3, Line 48, delete "deices" and insert -- devices --.

In Column 5, Line 34, delete "valiance" and insert -- variance --.

In Column 5, Line 42, delete "the the" and insert -- the --.

In Column 5, Line 55, delete "test test" and insert -- test --.

In Column 5, Line 64, delete "test test" and insert -- test --.

Signed and Sealed this
Twenty-seventh Day of August, 2024

Katherine Kelly Vidal
*Director of the United States Patent and Trademark Office*